US008411462B2

(12) United States Patent
Jang et al.

(10) Patent No.: US 8,411,462 B2
(45) Date of Patent: Apr. 2, 2013

(54) NOISE REDUCTION APPARATUS OF MOBILE TERMINAL

(75) Inventors: Seok Min Jang, Suwon-si (KR); Jae Young Jang, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 283 days.

(21) Appl. No.: 12/925,958

(22) Filed: Nov. 3, 2010

(65) Prior Publication Data

US 2011/0116243 A1 May 19, 2011

(30) Foreign Application Priority Data

Nov. 19, 2009 (KR) ........................ 10-2009-0111956

(51) Int. Cl.
*H05K 7/02* (2006.01)

(52) U.S. Cl. .................. 361/807; 361/600; 361/679.01; 361/679.02; 361/679.09; 361/679.56; 361/730; 361/749; 361/824; 174/650; 455/550.1; 455/575.4

(58) Field of Classification Search .................. 361/807, 361/600, 679.01, 679.02, 679.09, 679.56, 361/730, 749, 824; 174/650; 455/550.1, 455/575.4
See application file for complete search history.

(56) References Cited

U.S. PATENT DOCUMENTS

2009/0005134 A1 1/2009 Abdul-Gaffoor et al.
2009/0061964 A1 3/2009 Kim et al.

FOREIGN PATENT DOCUMENTS

EP 1 953 768 A2 8/2008

OTHER PUBLICATIONS

European Search Report dated Mar. 23, 2011 in connection with European Patent Application No. 10 18 8659.

*Primary Examiner* — Xiaoliang Chen

(57) ABSTRACT

A noise reduction apparatus of a mobile terminal improves reception sensitivity by creating a electrical closed loop. The mobile terminal has a main circuit board and a slide hinge. The mobile terminal also includes a flexible printed circuit board (FPCB) that includes a first end coupled to the main circuit board and a second end fixed and coupled to a portion of an upper surface of the slide hinge. A noise reduction apparatus is installed between the main circuit board and the slide hinge to form an electronic closed loop that includes the main circuit board, the FPCB, the slide hinge, and the noise reduction apparatus. Noise is reduced by inducing noise abandoned to a slide hinge through a FPCB to an electrical close loop formed by the noise reduction apparatus, thereby improving reception sensitivity.

20 Claims, 3 Drawing Sheets

NOISE REDUCTION APPARATUS OF MOBILE TERMINAL

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Nov. 19, 2009 and assigned Serial No. 10-2009-0111956, the entire disclosure of which is hereby incorporated by reference.

TECHNICAL FIELD OF THE INVENTION

The present invention relates to a noise reduction apparatus of a mobile terminal and, more particularly, to a noise reduction apparatus of a mobile terminal that can improve reception sensitivity by lowering a level of noise that deteriorates reception sensitivity.

BACKGROUND OF THE INVENTION

In general, most of an internal structure of a mobile terminal that can view a display screen using a slide hinge is formed with a flexible printed circuit board (FPCB).

FIG. 1 is a partially side cross-sectional view illustrating a configuration of an existing mobile terminal.

Referring to FIG. 1, a mobile terminal 200 includes a main circuit board 210 in which various elements 212 are provided, slide hinge 220, and a FPCB 230. The FPCB 230 has one end coupled to one side of the main circuit board 210 and the other end connected to the slide hinge 220 and, thus, is freely bent when performing a slide movement. Images and control signals output from the main circuit board 210 to a display unit 250 are communicated through the FPCB 230. Some of signals moving through a line of the FPCB 230 are abandoned (see arrows) in a surface of the slide hinge 220 by coupling phenomenon with the slide hinge 220, which is a conductive material. Signals abandoned to the slide hinge 220 operate as noise that cause radiation at both end portions of the slide hinge 220. The noise causes interference in a main antenna of the mobile terminal 200 or a radio frequency (RF) module of the main circuit board 210, thereby deteriorating reception sensitivity.

SUMMARY OF THE INVENTION

To address the above-discussed deficiencies of the prior art, it is a primary object to provide a noise reduction apparatus of a mobile terminal that can improve reception sensitivity by lowering a level of noise that deteriorates reception sensitivity.

In accordance with an aspect of the present invention, a mobile terminal that includes a main circuit board and a flexible printed circuit board FPCB that is fixed and coupled to a portion of an upper surface of a slide hinge includes a noise reduction apparatus installed between the main circuit board and the slide hinge to form an electronic closed loop with the FPCB.

Preferably, the noise reduction apparatus is installed between the main circuit board and the slide hinge.

Preferably, the noise reduction apparatus includes a shield can coupled and fixed to a lower surface of the main circuit board and a gasket coupled between the shield can and the slide hinge with a first side of the gasket abutting the shield can and a second side of the gasket abutting a portion of the FPCB that is fixed and coupled to a portion of an upper surface of a slide hinge.

In accordance with another aspect of the present invention, a noise reduction apparatus for a mobile terminal comprising a main circuit board, a slide hinge, and a flexible printed circuit board (FPCB) comprising a first end coupled to the main circuit board and a second end fixed and coupled to a portion of an upper surface of the slide hinge is provided. The noise reduction apparatus includes a shield can installed between the main circuit board and the slide hinge, the shield can coupled and fixed to a lower surface of the main circuit board. The noise reduction apparatus also includes a shock absorbing component coupled between the shield can and the slide hinge, a top surface of the shock absorbing component coupled to the shield can and a bottom surface of the shock absorbing component coupled to the second end of the FPCB that is fixed and coupled to the portion of the upper surface of the slide hinge. The noise reduction apparatus is installed between the main circuit board and the slide hinge to form an electronic closed loop that comprises the main circuit board, the FPCB, the slide hinge, and the noise reduction apparatus.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
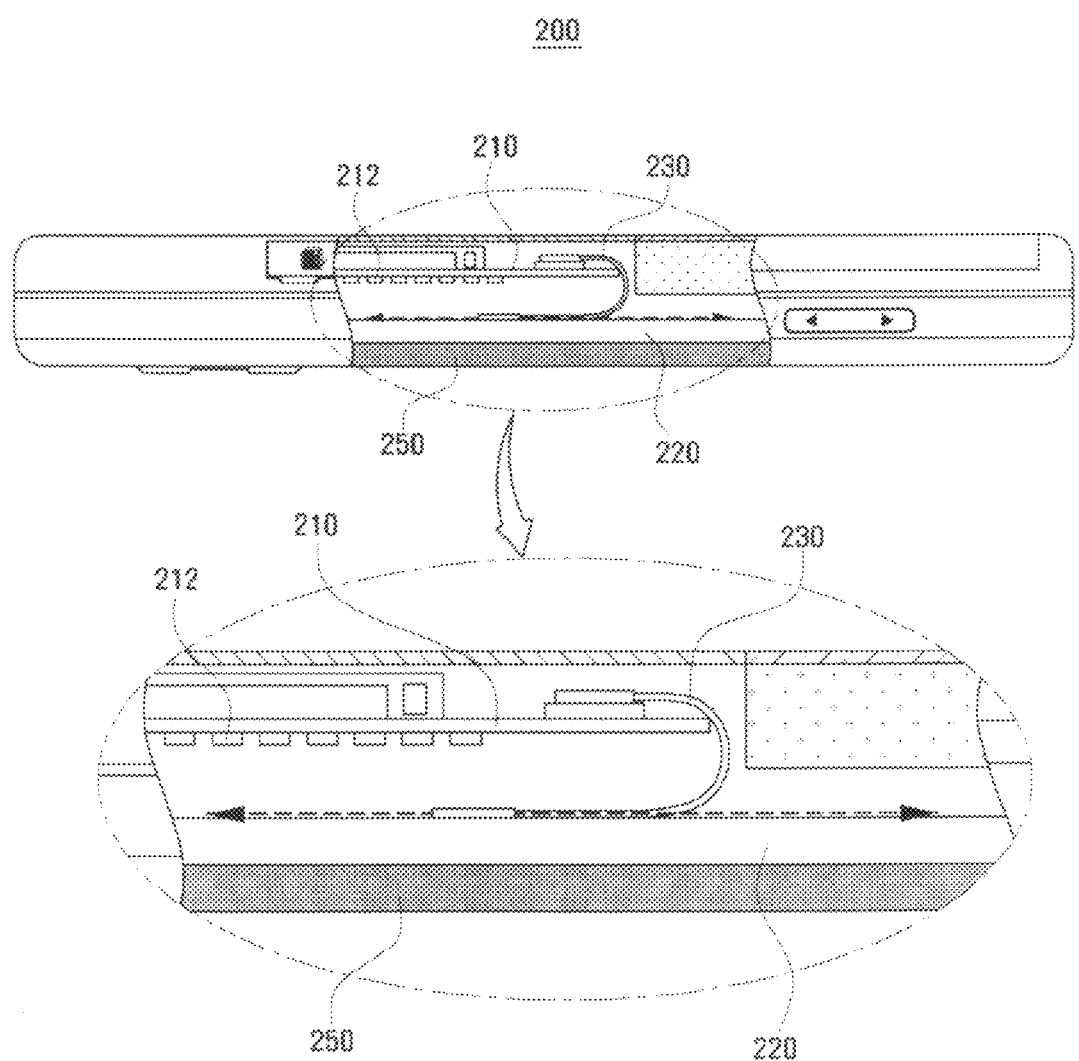
FIG. 1 illustrates a partially side cross-sectional view of an existing mobile terminal.
Figure 2:
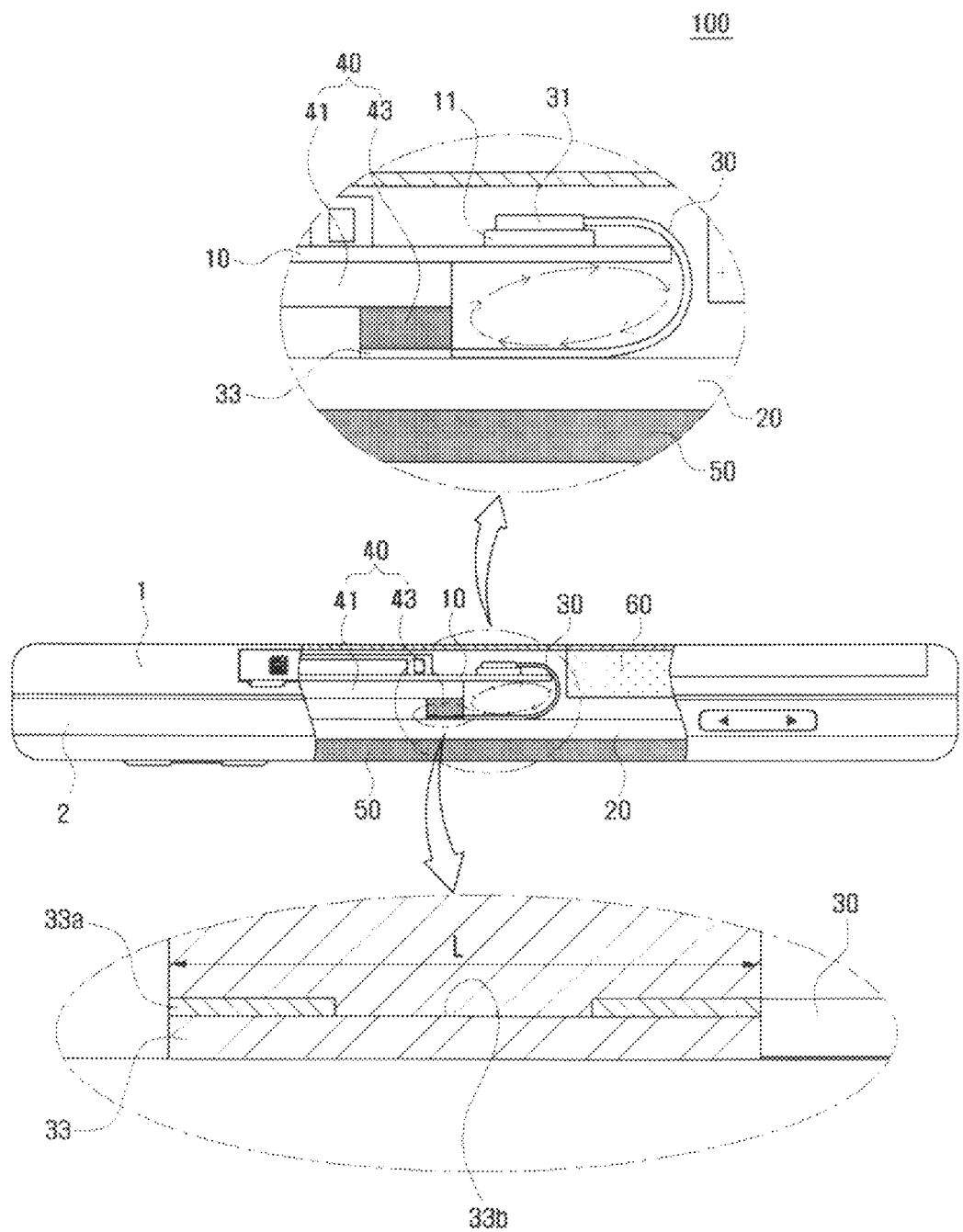
FIG. 2 illustrates a partially side cross-sectional view of a mobile terminal that uses a gasket according to an embodiment of the present invention.
Figure 3:
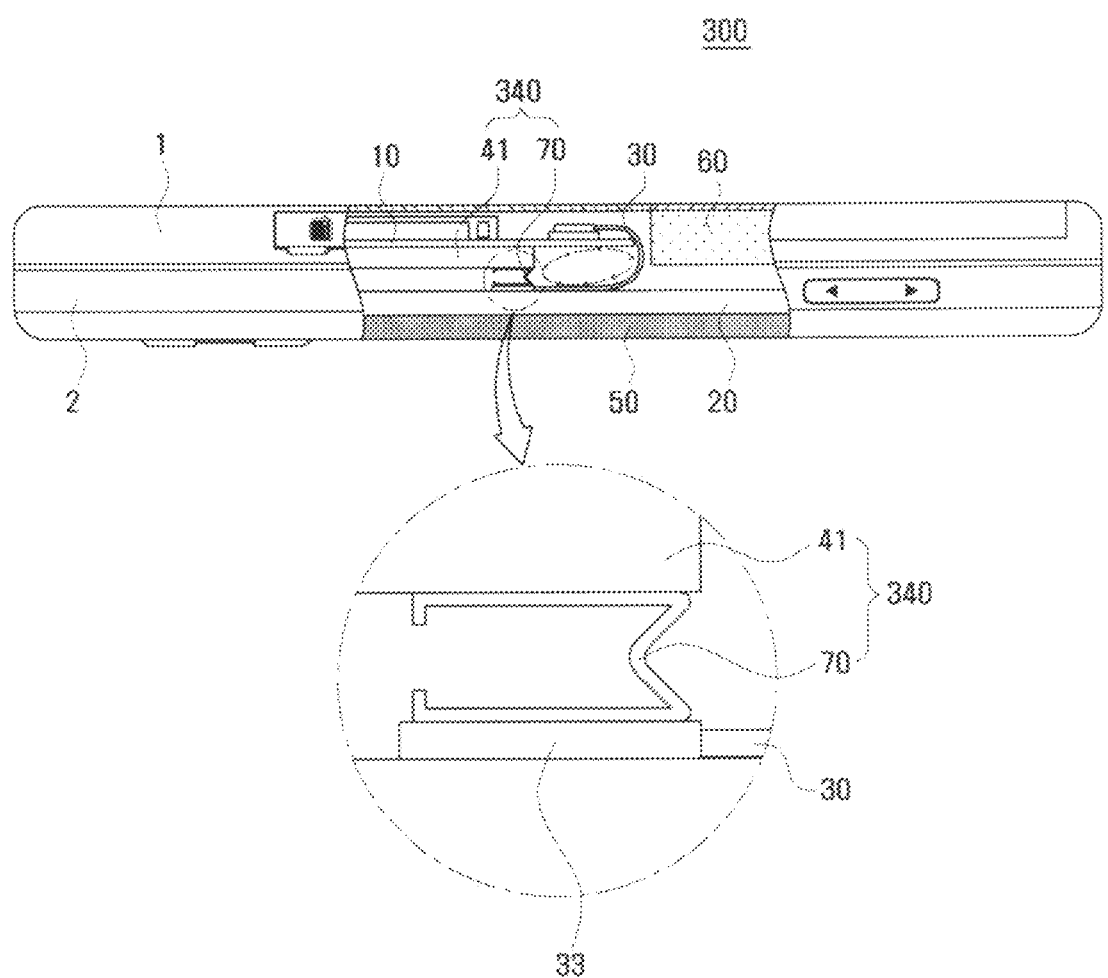
FIG. 3 illustrates a partially side cross-sectional view of a mobile terminal that uses a flat spring according to an embodiment of the present invention.

FIGS. 2 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present invention.

FIG. 2 illustrates a partially side cross-sectional view of a mobile terminal 100 that uses a gasket according to an embodiment of the present invention.

The mobile terminal 100 may be a folder type terminal or a slide type terminal. For convenience of description, the mobile terminal 100, as illustrated in FIG. 2, is assumed to be a slide type terminal.

Referring to FIG. 2, the mobile terminal 100 includes a main body 1 that includes a main circuit board 10 in which various elements are soldered therein, a slide unit 2 in which a display unit 50 is installed, a slide hinge 20 installed between the main body 1 and the slide unit 2 to connect the main body 1 and the slide unit 2 and for performing a sliding movement along the length of the slide unit 2, an FPCB 30, and a noise reduction apparatus 40 located between the main circuit board 10 and the slide hinge 20.

The noise reduction apparatus 40, which suppresses noise deteriorating reception sensitivity, is installed between the main circuit board 10 and the slide hinge 20 to form a closed loop comprising the noise reduction apparatus 40, the main circuit board 10, the FPCB 30, and the sliding hinge 20. The noise reduction apparatus 40 includes a shield can 41 and a gasket 43.

One end of the FPCB 30 is fitted and coupled to a male connector 31, which is coupled to a female connector 11 on an upper surface of the main circuit board 10. The other end of the FPCB 30 is bent over an edge of the main circuit board 10 and fixed to a fixing unit 33 on an upper surface of the slide hinge 20. Positions of the female connector 11 and the male connector 31 can be changed. The fixing unit 33 has the same configuration as that of the FPCB 30 and is made of a rigid material in order to fix onto the upper surface of the slide hinge 20. The fixing unit 33 is also connected to one end of the FPCB 30 that is coupled to the display unit 50. The fixing unit 33 is formed of, in order from an upper part to a lower part, a coating layer, ground layer, and signal layer in order to have the same configuration as that of the FPCB 30.

The shield can 41 is formed in a hollow form and has a box shape with one opened surface. The top surface of the shield can 41 is coupled and fixed to a lower surface of the main circuit board 10 while enclosing various elements to intercept noise discharged from various elements and noise from the outside. A portion fixed and coupled to the main circuit board 10 is electrically connected to a ground layer (not shown) of the main circuit board 10. The shield can 41 is made of a conductive material and is formed hard to have strength to protect various elements of the main circuit board 10 from an external impact.

The shield can 41 has a separation wall to intercept noise by separating various elements of the main circuit board 10 into several areas within the shield can 41.

The gasket 43 is coupled between the shield can 41 and the fixing unit 33. The top surface of the gasket 43 abuts the bottom surface of the shield can 41, and the bottom surface of the gasket 43 abuts an upper surface of the fixing unit 33. The gasket is made of a conductive material and an elastic material, supports the shield can 41, and performs a shock-absorbing operation that can elastically absorb an external impact. That is, the shield can 41 performs a function of a support in a lower part of the shield can 41 in order to absorb an impact while being supported to not be separated from the main circuit board 10 by an external impact. Referring to an enlarged portion of a contact portion of the gasket 43 and the fixing unit 33 of FIG. 2, by removing a coating layer 33a of an upper surface of the fixing unit 33, a ground surface 33b of a ground layer is exposed and thus the gasket 43 contacts the ground surface 33b. Therefore, the shield can 41 is also electrically coupled to the ground surface 33b of the fixing unit 33 through the gasket 43, and thus the main circuit board 10 and a ground layer (not shown) of the FPCB 30 are electrically coupled.

A length L of the gasket 43 supports the shield can 41 and should have a length that is sufficient to maintain contact with the ground surface 33b of the fixing unit 33. The gasket 43 should have the same width as that of the fixing unit 33 or that of the FPCB 30. It is preferable that an end portion of the gasket 43 in a direction opposite to the FPCB 30 corresponds to an end portion of the shield can 41 of the same direction. Further, in an embodiment, the gasket 43 contacts the ground surface 33b of the fixing unit 33 of the FPCB 30, but a contact portion of the gasket 43 is not limited thereto and the gasket 43 can directly contact with the ground layer of the FPCB 30 by exposing.

In addition, the mobile terminal 100, in an embodiment, may include all elements included in an existing mobile terminal, such as a battery unit 60, a keypad, a touch pad, and a camera module. These elements are well known, and therefore, a detailed description thereof is omitted.

A moving path of noise due to the noise reduction apparatus 40 is as follows. Referring to an exploded portion of a noise moving path (indicated by arrows) of FIG. 2, noise generated in the main circuit board 10 arrives in the ground surface 33b of the fixing unit 33 via the ground layer of the FPCB 30 through the female connector 11 formed in the main circuit board 10 and the male connector 31 of the FPCB 30. The noise, which has arrived in the ground surface 33b, arrives in a lower surface of the shield can 41 that is electrically connected to the upper end of the gasket 43 by moving through the lower surface of the gasket 43 that is electrically coupled to the ground surface 33b. Some of the noise which arrives at the lower surface of the shield can 41 disappear in a ground layer of the main circuit board 10, which is electrically coupled to the upper surface of the shield can 41, and some noise repeatedly circulates through the ground layer of the FPCB 30 and finally disappears through a circulation process. That is, a moving path of noise forms an electrical closed loop formed by the main circuit board 10, the FPCB 30, the fixing unit 33, the gasket 43, and the shield can 41. Therefore, the noise circulates only in a closed loop and is finally converted to heat to disappear, or disappears in some other form. Therefore, deterioration of reception sensitivity due to noise can be prevented.

Improvement of reception sensitivity can be determined through Tables 1 and 2. Table 1 illustrates a measured result of reception sensitivity of a mobile terminal before a noise reduction apparatus is implemented, and Table 2 illustrates a measured result of a reception sensitivity of a mobile terminal with a noise reduction apparatus implemented. A measurement experiment shows an experiment result of a bit error rate (BER) of GSM850 Band on a 3D chamber.

TABLE 1

| | GSM850 Band BER Sensitivity | |
|---|---|---|
| Channel | Maximum | Average |
| 128 | 97.5 | 96.95 |
| 190 | 98.0 | 96.84 |
| 251 | 102.5 | 101.5 |

TABLE 2

| | GSM850 Band BER Sensitivity | |
|---|---|---|
| Channel | Maximum | Average |
| 128 | 103.0 | 102.5 |
| 190 | 103.0 | 102.0 |
| 251 | 106.5 | 105.4 |

As shown in Tables 1 and 2, when an experiment is performed in 128 channel, 190 channel, 251 channel, which are three values between 128 channel and 251 channel, reception sensitivity of a mobile terminal to which the noise reduction apparatus 40 is applied is greater by up to 5 dB than reception sensitivity of a mobile terminal to which the noise reduction apparatus 40 is not applied.

In this way, by forming an electrical closed loop with the shield can 41 and the gasket 43, noise rotates along a path of a closed loop and finally disappears.

FIG. 3 illustrates a partially side cross-sectional view of a mobile terminal 300 according to an embodiment of the present invention.

Referring to FIG. 3, the mobile terminal 300 includes a main circuit board 10, slide hinge 20, FPCB 30, and noise reduction apparatus 340.

The noise reduction apparatus 340 includes a shield can 41 and a flat spring 70.

The embodiment of the present invention illustrated in FIG. 3 has a similar configuration as that of the embodiment illustrated in FIG. 2, except that the gasket 43 of the embodiment illustrated in FIG. 2 is replaced with the flat spring 70.

The flat spring 70 is made of a conductive material and has elasticity, thereby performing the same function as that of the gasket 43. That is, the flat spring 70 performs a shock-absorbing operation on an external impact and performs a function as a support for supporting the shield can 41. When the flat spring 70 abuts the fixing unit 33, the flat spring 70 is electrically coupled to the ground surface 33b of FIG. 2. The flat spring 70 may be a compression spring.

Therefore, by such a configuration, noise rotates along a path of a closed loop and finally disappears, such that reception sensitivity can be prevented from being deteriorated by noise.

As described above, according to the present invention, noise is reduced by inducing noise abandoned to a slide hinge through a FPCB to an electrical closed loop formed by a noise reduction apparatus, thereby improving reception sensitivity.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A mobile terminal comprising:
a main circuit board;
a slide hinge;
a flexible printed circuit board (FPCB) comprising a first end coupled to the main circuit board and a second end fixed and coupled to a portion of an upper surface of the slide hinge; and
a noise reduction apparatus installed between the main circuit board and the slide hinge to form an electronic closed loop that comprises the main circuit board, the FPCB, the slide hinge, and the noise reduction apparatus.

2. The mobile terminal of claim 1, wherein the noise reduction apparatus comprises:
a shield can installed between the main circuit board and the slide hinge, the shield can coupled and fixed to a lower surface of the main circuit board; and
a gasket coupled between the shield can and the slide hinge, a top surface of the gasket abutting the shield can and a bottom surface of the gasket abutting the second end of the FPCB that is fixed and coupled to the portion of the upper surface of the slide hinge.

3. The mobile terminal of claim 1, wherein the noise reduction apparatus comprises:
a shield can installed between the main circuit board and the slide hinge, the shield can coupled and fixed to a lower surface of the main circuit board; and
a flat spring coupled between the shield can and the slide hinge a top surface of the flat spring abutting the shield can and a bottom surface of the flat spring coupled to the second end of the FPCB that is fixed and coupled to the portion of the upper surface of the slide hinge.

4. The mobile terminal of claim 1, wherein the noise reduction apparatus is made of a conductive material.

5. The mobile terminal of claim 2, wherein the gasket is made of an elastic material.

6. The mobile terminal of claim 3, wherein the flat spring is a compression spring.

7. The mobile terminal of claim 1, wherein the second end of the FPCB is a grounded portion.

8. The mobile terminal of claim 2, wherein the shield can is formed with electrically conductive material and has strength to protect at least one element of the main circuit board from external impact.

9. The mobile terminal of claim 1, further comprising a fixing unit formed on the portion of the upper surface of the sliding hinge, wherein the second end of the FPCB is coupled to the fixing unit.

10. The mobile terminal of claim 9, wherein the fixing unit comprises, from top to bottom, a coating layer, ground layer, and a signal layer, and wherein a portion of the coating layer is removed such that the bottom of the noise reduction apparatus is coupled to the ground layer of the fixing unit.

11. A noise reduction apparatus for a mobile terminal comprising a main circuit board, a slide hinge, and a flexible printed circuit board (FPCB) comprising a first end coupled to the main circuit board and a second end fixed and coupled to a portion of an upper surface of the slide hinge, the noise reduction apparatus comprising:
a shield can installed between the main circuit board and the slide hinge, the shield can coupled and fixed to a lower surface of the main circuit board; and
a shock absorbing component coupled between the shield can and the slide hinge, a top surface of the shock absorbing component coupled to the shield can and a bottom surface of the shock absorbing component coupled to the second end of the FPCB that is fixed and coupled to the portion of the upper surface of the slide hinge, wherein the noise reduction apparatus is installed between the main circuit board and the slide hinge to form an electronic closed loop that comprises the main circuit board, the FPCB, the slide hinge, and the noise reduction apparatus.

12. The noise reduction apparatus of claim 1, wherein the shock absorbing component is a gasket.

13. The noise reduction apparatus of claim 1, wherein the shock absorbing component is a flat spring.

14. The noise reduction apparatus of claim 11, wherein the shock absorbing component is made of a conductive material.

15. The noise reduction apparatus of claim 12, wherein the gasket is made of an elastic material.

16. The noise reduction apparatus of claim 13, wherein the flat spring is a compression spring.

17. The noise reduction apparatus of claim 11, wherein the second end of the FPCB is a grounded portion.

18. The noise reduction apparatus of claim 11, wherein the shield can is formed with electrically conductive material and protects at least one element of the main circuit board from external impact.

19. The noise reduction apparatus of claim 11, wherein the sliding hinge comprises a fixing unit formed on the portion of the upper surface of the sliding hinge, wherein the second end of the FPCB is coupled to the fixing unit.

20. The noise reduction apparatus of claim 19, wherein the fixing unit comprises, from top to bottom, a coating layer, ground layer, and a signal layer, and wherein a portion of the coating layer is removed such that the bottom of the noise reduction apparatus is coupled to the ground layer of the fixing unit.

* * * * *